United States Patent
Mooney

(10) Patent No.: US 8,131,511 B2
(45) Date of Patent: *Mar. 6, 2012

(54) APPARATUS FOR REGISTERING AND ANALYZING THE SPECTRAL SIGNATURE OF A DYNAMIC EVENT

(75) Inventor: Jonathan Martin Mooney, Irvine, CA (US)

(73) Assignee: Solid State Scientific Corporation, Hollis, NH (US)

(*) Notice: Subject to any disclaimer, the term of this patent is extended or adjusted under 35 U.S.C. 154(b) by 411 days.

This patent is subject to a terminal disclaimer.

(21) Appl. No.: 12/380,674

(22) Filed: Mar. 2, 2009

(65) Prior Publication Data

US 2010/0004887 A1 Jan. 7, 2010

Related U.S. Application Data

(63) Continuation of application No. 11/481,572, filed on Jul. 6, 2006, now Pat. No. 7,499,836, which is a continuation-in-part of application No. 11/397,355, filed on Apr. 4, 2006, now Pat. No. 7,155,354, which is a continuation-in-part of application No. 10/753,143, filed on Jan. 7, 2004, now abandoned.

(60) Provisional application No. 60/696,911, filed on Jul. 6, 2005, provisional application No. 60/438,375, filed on Jan. 7, 2003.

(51) Int. Cl.
*G04B 15/00* (2006.01)
*G01R 23/00* (2006.01)

(52) U.S. Cl. ............. 702/189; 702/65; 702/71; 702/75; 702/190; 356/303

(58) Field of Classification Search ............... 702/65, 702/71, 75, 77, 80, 179–189; 356/303, 305, 356/306, 320; 382/212, 216, 291
See application file for complete search history.

(56) References Cited

U.S. PATENT DOCUMENTS

| | | | |
|---|---|---|---|
| 5,801,826 A | | 9/1998 | Williams |
| 5,999,652 A | * | 12/1999 | Bushman ............. 382/221 |
| 6,747,738 B2 | | 6/2004 | Knapp |
| 2003/0142307 A1 | * | 7/2003 | Hutchin ............. 356/328 |
| 2004/0001201 A1 | | 1/2004 | Knapp |
| 2004/0109159 A1 | | 6/2004 | Schau |
| 2004/0227940 A1 | | 11/2004 | Mitchell |

* cited by examiner

*Primary Examiner* — Phuong Huynh
(74) *Attorney, Agent, or Firm* — Louis J. Franco; Law Office of Louis J. Franco

(57) ABSTRACT

Apparatus for registering the spectral signature of a dynamic source event include an imaging-sensor array configured to register electromagnetic energy over a predetermined range of electromagnetic wavelengths and an optical system configured for imaging onto the imaging-sensor array a dispersion pattern of electromagnetic energy emitted from a source event external to the optical system. The optical system includes (i) a focusing element and (ii) a selected set of optical dispersion apparatus. Among the optical dispersion apparatus are at least a first optically dispersive element that disperses a first selected set of wavelengths within the sensitivity range of the imaging-sensor array and at least a second optically dispersive element that disperses a second selected set of wavelengths within the sensitivity range of the imaging-sensor array such that wavelengths emitted from a source event that are within the first and second selected sets of wavelengths impinge simultaneously upon the imaging-sensor array along, respectively, a first extrapolated axis and a second extrapolated axis that is non-parallel to the first extrapolated axis.

18 Claims, 8 Drawing Sheets

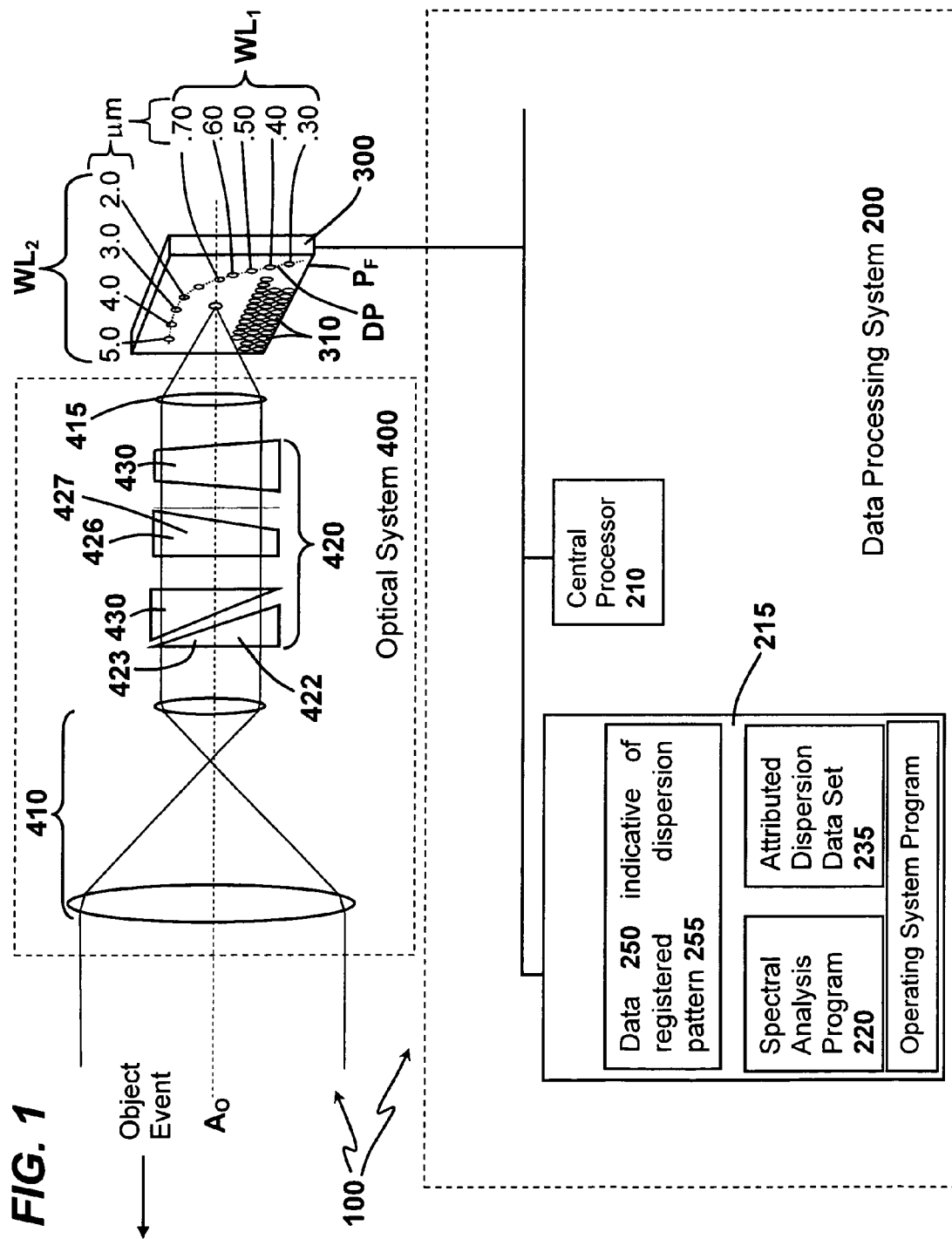

Representative electromagnetic wavelengths as registered by the imaging sensor array 300 at the focal plane $P_F$

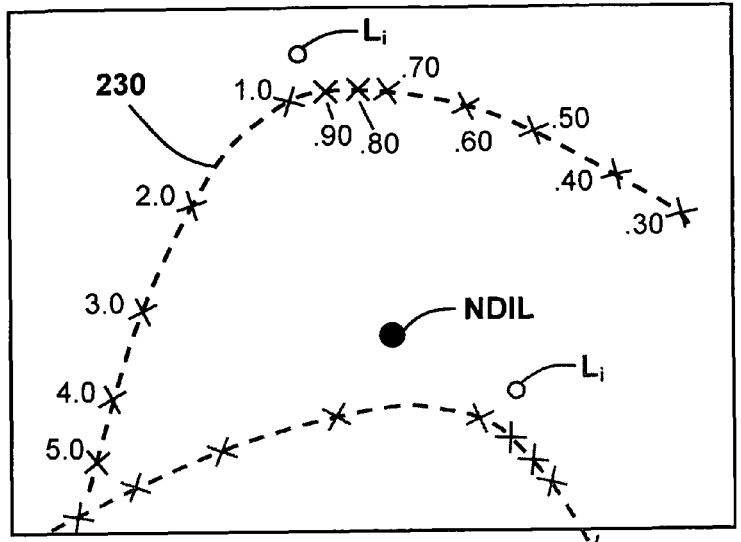

Graphical representation of pre-stored data indicative of an attributed, pre-contrived electromagnetic-energy dispersion pattern 230 associated with the optical dispersion apparatus 420

FIG. 4A

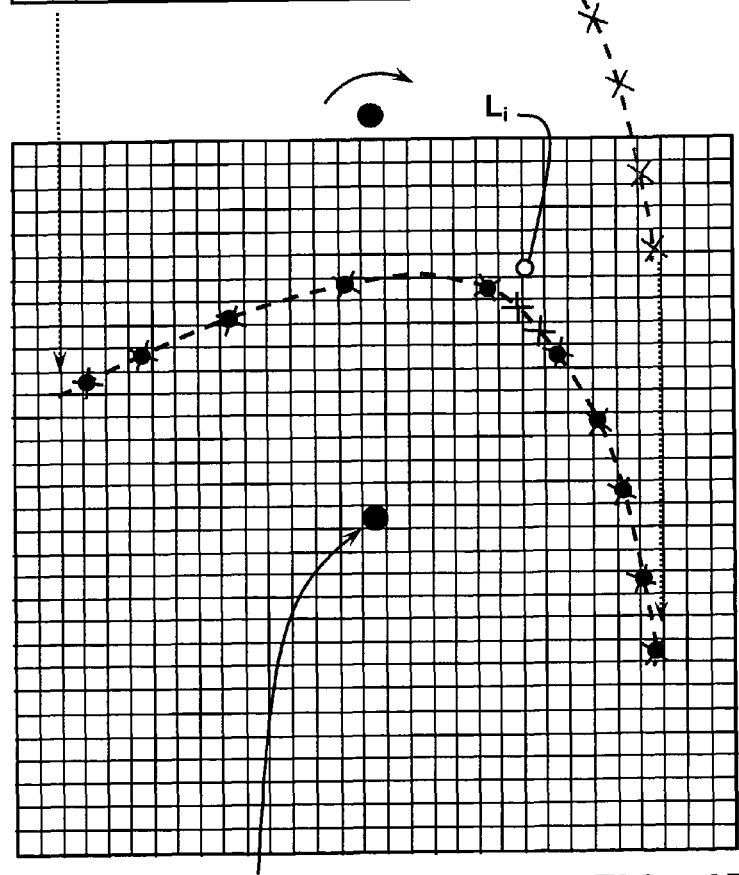

NDIL at x=16, y = 15

FIG. 4B

Graphical representation of pre-stored data indicative of an attributed, pre-contrived electromagnetic-energy dispersion pattern 230 associated with the optical dispersion apparatus 420 being algorithmically matched and co-oriented with data 255 indicative of the dispersion pattern registered by the imaging-sensor array in order to map an estimate of where, within the focal plane, the non-dispersed image of the object event would be located in the absence of the optical dispersion apparatus.

Illustrative Data 250 indicative of the registered dispersion pattern 255

| WAVELENGTH μm | X-VALUE | Y-VALUE | INTENSITY |
|---|---|---|---|
| . . . . . . . | | | |
| 5.0 | 4 | 21 | .3 |
| 4.0 | 6 | 22 | .9 |
| 3.0 | 10 | 24 | .7 |
| 2.0 | 15 | 25 | .5 |
| 1.0 | 21 | 25 | .2 |
| .90 | - - - | - - - | 0 |
| .80 | - - - | - - - | 0 |
| .70 | 24 | 22 | .3 |
| .60 | 26 | 19 | .5 |
| .50 | 27 | 16 | .7 |
| .40 | 28 | 12 | .1 |
| .30 | 28 | 9 | .05 |
| .20 | - - - | - - - | 0 |
| . . . . . . . | | | |

| A method of acquiring and analyzing the spectral signature of a point-like dynamic event in order to approximate the location of the event within a predetermined field of view, the method comprising 700 |

| providing a data processing system including a central processor and at least one memory device communicatively linked to the processor; 710 |

| providing an imaging-sensor array adapted to detect wavelengths over a predetermined range of electromagnetic wavelengths, the imaging-sensor array being communicatively linked to the data processing system; 715 |

| providing an optical system adapted for imaging electromagnetic energy emitted from a source event external to the optical system onto the imaging-sensor array, the optical system including a selected set of optical dispersion apparatus and a focusing element situated between the dispersion apparatus and the imaging-sensor array such that the imaging-sensor corresponds in location to the focal plane of the focusing element, the optical dispersion apparatus being characterized at least in part by a set of attributed pre-contrived electromagnetic-energy dispersion patterns including at least one dispersion signature correlating a non-dispersed image location along the focal plane with impingement positions upon the focal plane of a plurality of dispersed wavelengths within the sensitivity range of the imaging-sensor array, the non-dispersed image location being indicative of where, relative to the impingement positions of the dispersed wavelengths, the polychromatic image of an object event located at a predetermined position in a predetermined field of view would be located along the focal plane in the absence of the dispersion apparatus; 720 |

| maintaining a dispersion-pattern data set associating the selected set of optical dispersion apparatus with data indicative of the set of pre-contrived electromagnetic-energy dispersion patterns; 725 |

APPARATUS FOR REGISTERING AND ANALYZING THE SPECTRAL SIGNATURE OF A DYNAMIC EVENT

CROSS-REFERENCE TO RELATED APPLICATIONS/PRIORITY CLAIMS

The present application is a continuation application of U.S. application Ser. No. 11/481,572 filed Jul. 6, 2006 now U.S. Pat. No. 7,499,836 under the title "APPARATUS FOR AND METHODS OF DETECTING COMBUSTION IGNITION," which was a continuation-in-part of U.S. application Ser. No. 11/397,355 filed Apr. 4, 2006 now U.S. Pat. No. 7,155,354 under the title "APPARATUS FOR AND METHODS OF ANALYZING THE SPECTRAL SIGNATURE OF A DYNAMIC EVENT." In addition to being a continuation-in-part application, application Ser. No. 11/481,572 included subject matter based on, and claimed priority benefits in, Provisional Application Ser. No. 60/696,911 filed on Jul. 6, 2005, and entitled "APPARATUS FOR AND METHODS OF DETECTING COMBUSTION IGNITION." U.S. application Ser. No. 11/397,355 issued as U.S. Pat. No. 7,155,354 on Dec. 26, 2006, and was a continuation-in-part of the since-abandoned U.S. application Ser. No. 10/753,143 filed Jan. 7, 2004 under the title "APPARATUS FOR AND METHODS OF ANALYZING THE SPECTRAL SIGNATURE OF A DYNAMIC EVENT." application Ser. No. 11/481,572 was co-pending with the present application on the date the present application was filed.

Abandoned application Ser. No. 10/753,143 was the first non-provisional application in the continuation chain summarized above and was based on, and claimed the benefit of the filing date of, Provisional Application Ser. No. 60/438,375, filed on Jan. 7, 2003, and entitled "SPECTROMETER FOR CHARACTERIZATION OF UNCUED DYNAMIC EVENTS." The present application also claims the benefit of the filing date of Provisional Application Ser. No. 60/438,375 through Non-provisional application Ser. Nos. 11/481,572, 11/397,355 and 10/753,143, as well as the benefit of the filing date of Provisional Application Ser. No. 60/696,911 through Non-provisional application Ser. No. 11/481,572. Moreover, the entireties of the disclosures of all of the previous non-provisional and provisional applications, including the drawings, are incorporated herein by reference as if set forth fully in the present application.

BACKGROUND

1. Field

Implementations of the present invention relate generally to the field of spectral imaging systems and more particularly to the characterization of the spectral signatures of point-like events that evolve rapidly in time relative to the environment in which the events occur. Each of various implementations further involves a method and associated apparatus for approximating the location of a source event within a predetermined field of view based on a set of pre-contrived dispersion patterns correlated with a set of optical dispersion apparatus used in imaging the spectrum associated with the event.

2. Brief Description of an Illustrative Environment and Related Art

Spectral imaging is the art of quantifying the spectral and spatial characteristics of a scene within a "field of view." Optical devices known generally as imaging spectrometers have been developed for measuring and analyzing the spectral content of electromagnetic radiation in various ranges within the spectrum of optical wavelengths. These include, by way of non-limiting example, the ultraviolet; visible; and near, short-wave, mid-wave and long-wave infrared ranges of the electromagnetic spectrum. For purposes of this specification, and the appended claims, all wavelengths of the electromagnetic spectrum are included within the definition of "light," regardless of visibility with respect to the human eye. In other words, the terms "light," "electromagnetic energy" and "electromagnetic radiation" are regarded as wholly interchangeable and may be used interchangeably throughout the specification.

Spectral images are typically acquired by scanning the image of a slit across the image of an overall scene, but many hardware configurations that execute alternative imaging modes are available. A spectral image usually consists of a sequence of monochromatic images, wherein each monochromatic image represents the scene as it would appear when viewed over a limited wavelength band and each image in the sequence is centered at a unique wavelength. Accordingly, spectral images are inherently three-dimensional (i.e., they include two spatial dimensions and one spectral dimension) and, therefore, some type of multiplexing is required in order to acquire and display the data in two dimensions.

Three current and emerging multiplexing methods are (1) temporal multiplexing, (2) multiplexing at the image plane and (3) multiplexing at a pupil. Temporal multiplexing is commonly used to acquire image data; however, temporal multiplexing introduces artifacts when the scene is not static. Therefore, most spectral imagers work well for scenes consisting of static objects, but fail to accurately represent scenes including events that evolve rapidly in time (i.e., dynamic events). Examples of devices that implement temporal multiplexing include sensors that spatially image and temporally scan over wavelength or over the Fourier Transform of frequency, and technologies that record two-dimensional information along one spatial and one spectral dimension and scan along the remaining spatial dimension in time. Among these devices are filter wheel spectrometers, Fourier Transform spectrometers and scanned slit spectrometers.

The most widely implemented spectral imaging technologies involve multiplexing at the image plane. Image-plane multiplexing apparatus are embodied in nearly all consumer digital still cameras and camcorders. In these devices, pigments or dyes are lithographically placed on individual pixels on the focal plane array typically in what is known as a Bayer pattern. Alternative schemes stack pixels on top on one another, or disperse light collected form each pixel.

Multiplexing at an entrance pupil frequently involves an arrangement of multiple parallel cameras wherein in each camera is filtered to a specific spectral band.

When an event location is known, conventional spectral imaging techniques are adequate for characterizing the spectral signature of the event, but when the location is unknown, the performance of conventional sensors is often unsatisfactory. Conventional sensors employ scanning techniques to multiplex the 3-dimensional spectral imagery (i.e., two spatial dimensions and one spectral dimension) onto a 2-dimensional focal plane array. When the event is uncued, neither its location nor its timing are known and the entire field of view must be rapidly scanned to capture the signature. When the sensor is monitoring a large field of view, the integration time at any given pixel is limited and the sensor noise floor swamps the signal.

Accordingly, a need exists for a method and apparatus for analyzing and characterizing the spectral signature of uncued dynamic events in a manner that provides useful information indicative of the spectral temporal evolution of the event and of the event location within a field of view.

SUMMARY

An objective of various implementations is to facilitate an approximation of the location of a point-like dynamic event within a predetermined field of view by analyzing the spectral signature of the event using a set of computer-executed spectral analysis algorithms. A "point-like" event is an event that is regarded as "small" relative to an overall predetermined field of view in which the event occurs. The event to be analyzed may, throughout the specification and claims, be referred to alternatively as "event," "object event," "source event," "object source event," or by some similar designation. Various versions comprise providing a data processing system including a central processor and at least one memory device communicatively linked to the processor. An imaging-sensor array configured to detect wavelengths over a predetermined range of electromagnetic wavelengths is provided and communicatively linked to the data processing system. An optical system configured for imaging electromagnetic energy emitted from a source event external to the optical system onto the imaging-sensor array is provided and optically aligned with the imaging-sensor array. In various alternative implementations, the optical system includes a selected set of optical dispersion apparatus and a focusing element situated between the dispersion apparatus and the imaging-sensor array such that the location of the imaging-sensor corresponds to the focal plane of the focusing element. The set of optical dispersion apparatus is characterized at least in part by a set of attributed pre-contrived electromagnetic-energy dispersion patterns including at least one dispersion signature correlating, for example, a non-dispersed image location along the focal plane with impingement positions upon the focal plane of a plurality of dispersed wavelengths within the sensitivity range of the imaging-sensor array. A non-dispersed image location is indicative of where, relative to the impingement positions of the dispersed wavelengths, the polychromatic image of an object event located at a predetermined position in a predetermined field of view would be located within the focal plane in the absence of the dispersion apparatus. Moreover, while reference to a non-dispersed image location is one alternative way of correlating the impingement positions upon the focal plane of the dispersed wavelengths with the location, within a predetermined field of view, of the object event that emitted the electromagnetic energy from which the registered dispersion pattern was produced, the impingement positions may be otherwise correlated with the object-event location within a predetermined field of view. The set of pre-contrived electromagnetic dispersion patterns attributed to the optical dispersion apparatus may be determined by at least one of (i) theoretical calculation of expected dispersion behavior based on such parameters as the type, shape, optical properties and orientation of the optical dispersion apparatus and (ii) empirically derived and recorded dispersion behavior under known conditions.

A dispersion-pattern data set associating the selected set of optical dispersion apparatus with data indicative of the set of pre-contrived electromagnetic-energy dispersion patterns is maintained and stored in computer memory for access by the data processing system.

Using apparatus provided and arranged in general accord with steps described above, an approximation as to the location of a source event is indicated, in various implementations, by (i) causing polychromatic electromagnetic energy from an event to be analyzed to pass through the optical system such that the optical dispersion apparatus disperses a selected plurality of constituent wavelengths therein and such that the dispersed wavelengths impinge simultaneously upon the focal plane; (ii) registering the dispersion pattern at the imaging-sensor array and storing data indicative of the registered dispersion pattern in computer memory; and (iii) executing a spectral analysis algorithm that consults the dispersion-pattern data set associated with the selected set of optical dispersion apparatus and matches and co-orientates as closely as practicable a pre-contrived electromagnetic-energy dispersion pattern with the data indicative of the registered dispersion pattern in order to approximate, with reference to the non-dispersed image location correlated with the matched and co-oriented pre-contrived electromagnetic-energy dispersion pattern, the location within a predetermined field of view of the object event that emitted the electromagnetic energy from which the registered dispersion pattern was produced.

It will be appreciated that the dispersion-pattern data set represents a kind of dispersion-pattern "template" representative of what is known in advance about how the dispersion apparatus with which the template is associated disperses various particular wavelengths of light originating from a source of known or "attributed" location, within a predetermined field of view, relative to the dispersed wavelengths. Once constituent wavelengths from an event to be analyzed are dispersed by the known set of optical apparatus and data indicative of the dispersion pattern registered at the imaging-sensor array is stored in computer memory, the template is algorithmically "superimposed" over the registered dispersion pattern data and oriented so as to "best fit" the registered dispersion pattern data. In various versions of those implementations referencing a non-dispersed image location, the location of the non-dispersed image location associated with the template indicates where the image of the event would be located along the focal plane in the absence of the dispersion apparatus.

In addition to the relative positions along the focal plane (or along the imaging-sensor array) of variously dispersed wavelengths, various alternative implementations further register and include among the stored data indicative of the registered dispersion pattern information as to the intensity of light at each of a selected set of wavelengths emitted from the event. Provided with intensity information, in addition to relative wavelength-position information, a set of spectral analysis algorithms can, in various versions, yield not only an approximation of the event location, but information as to the character and cause of the event. For instance, a distant explosion fueled by hydrogen gas will have a spectral signature distinguishable from a distant explosion fueled by vapors of aircraft fuel. Other events of interest may include, by way of non-limiting example, missile and rocket launches and in-flight signatures. For instance, a rocket type and location may be identifiable by the spectral signature of its burning exhaust.

In a typical implementation, the data registered in each frame by the imaging-sensor array along the focal plane includes information from which the event spectrum can be reconstructed, but it does not provide this information directly. Various versions implement algorithmic signal extraction comprising steps of (i) clutter removal, (ii) detection, (iii) location approximation and (iv) spectrum extraction. Although each of these four aspects is briefly treated separately below, it is to be understood that, in alternative versions, two or more of these aspects can be efficiently combined. The optimal implementation under a particular set of circumstances depends at least in part on the operational requirements and processing capacity of the imaging-sensor.

In various implementations, the clutter removal aspect presumes that the clutter is static in time as the event rapidly evolves. The clutter is removed by subtracting data representing one or more frames acquired before the event (i.e., "reference frames") from acquired frames that include the spectral signature. The temporal noise of the clutter removal can be reduced by averaging data representative of multiple reference frames prior to the subtraction operation. In one illustrative version, the reference frame average is accumulated as an Infinite Impulse Response (IIR) filter while, in another alternative version, reference frames are stored in a ring buffer and the average is implemented as a Finite Impulse Response (FIR) filter.

In the absence of an event, the output of the clutter removal has a mean value of zero. A dynamic event is detected by scanning the clutter-free data for anomalously high signal values. In some versions, the scan involves a simple detection of bright pixels. In alternative versions, the scanning aspect utilizes knowledge of how the broadband signature is dispersed along the focal plane. In any case, the scan and detection aspect can be implemented as correlation or matched-filter based signal processing.

In various implementations, optical dispersion apparatus are selected to facilitate the dispersion of the wavelengths of interest such that the wavelength impingement positions define a path including first and second "arms" extending outwardly from an inflection point. Approximating the location of the dispersion signature is simplified by the fitting of first and second extrapolated axes to the two "arms" of the dispersion pattern because the angular orientation of the extrapolated axes is known. Accordingly, in many instances, only one parameter for each of the axes need be determined (i.e., the location where the two axes intersect). The intersection location will have a fixed relationship with the non-dispersed image location and, therefore, serves as a reference for signal extraction. Although the extrapolated axes need not be orthogonal, the approximation of the non-dispersed image location is generally improved as the extrapolated axes approach orthogonality. In alternative versions in which a non-dispersed image location is not defined or referenced, the intersection location is alternatively correlated with the location, within a predetermined field of view, of an emitting source event. In any event, it will be appreciated that the simultaneous impingement upon the focal plane of first and second sets of wavelengths along first and second non-parallel extrapolated axes facilitates the registration by the imaging sensor array of disparate wavelengths along two non-parallel "arms" of a single dispersion pattern simultaneously (e.g., within the same "data frame") and that the impingement positions of the dispersed wavelengths defining the "arms" and the orientations of the non-parallel extrapolated axes along which the arms extend are correlated to a position within a predetermined field of view of the object event that emitted the electromagnetic energy from which the registered dispersion pattern was produced.

Some previously known apparatus include rotatable optics that facilitate the projection upon a focal plane of linear dispersion patterns along non-parallel axes by registering two or more temporarily-separated data frames. For instance, U.S. Pat. No. 6,747,738 to Knapp is drawn to an "Optical System with Variable Dispersion" having two basic modes of operation: (i) a first mode in which first and second sets of paired, optically-dispersive elements are rotated in tandem about a common rotation axis in order to reorient the direction of dispersion upon an image plane and (ii) a second operative mode in which the first and second sets of paired, optically-dispersive elements are rotated relative to one another in order to vary the amount of the dispersion along a dispersion line in the image plane. In the first operative mode, the impingement points of the dispersed constituent wavelengths are maintained in constant relative positions along a single line or axis, but are angularly re-oriented as a group upon the image plane. In the second operative mode, the angular orientation of the line along which the impingement points extend upon the image plane is held constant, but the degree of the dispersion is variable. While apparatus such as Knapp's facilitate the projection upon a focal plane of dispersion patterns extending generally along non-parallel extrapolated axes, those dispersion patterns cannot be projected and registered simultaneously. Instead, a first "frame" corresponding to the detection of a first "linear" dispersion pattern oriented at a first angle upon the image plane must be projected and registered followed by the projection and registration of a temporally-separated second "frame" that includes the dispersion pattern oriented at a second angle that is non-parallel to the first angle. In between the registration of the first and second frames, the optically dispersive elements would be rotated in tandem to achieve the dispersion pattern's second angular orientation (along a second extrapolated axis non-parallel to the first extrapolated axis). Although the dispersion data acquired in two such temporally separated frames could be useful for source-location estimates, along two lineal dimensions within the image plane, when acquired from relatively stationary and "non-dynamic" events, the usefulness of such data would be substantially diminished when acquired from a source that at least one of (i) moves rapidly across the field of view and (ii) develops rapidly such that its spectral signature differs between the first and second frames, as may well by the case, for example, in the image-capture of an explosion or a muzzle flash.

Referring again to the present invention, the angular orientation of a dispersion pattern along the focal plane can, in various versions, be adjusted by rotating the entire set of dispersion apparatus about the optical axis with respect to the imaging-sensor array. It should be noted that the sampling of the line spread function is typically greatly improved when the dispersion pattern is oriented such that, for example, the extrapolated axes are "tipped" relative to the x-y grid along which rows and columns of detectors of the imaging-sensor array extend. The precision of both algorithmic event-location approximation and spectral signature extraction are improved by as much as a factor of 10 when the "arms" of a spectral dispersion pattern yielded from an event are tipped rather than aligned with a column and row of detectors. In many instances, a dispersion signature fittable to orthogonally extending extrapolated axes, each of which axes is oriented at a 45-degree angle relative to x-y axes of the grid along which rows and columns of detectors extend, is regarded as optimal, for example.

Alternative implementations combine the detection and location-approximating aspects. In some versions of such implementations, clutter-free frames are correlated with a "two-armed" template (e.g., an "ideal" L-shaped template), representing two non-parallel axes. The template is a binary mask that is resampled onto the image lattice (i.e., data indicative of the dispersion pattern registered at the imaging-sensor array). The resampling process converts the binary values of 0 and 1 to floating-point values between and including 0 and 1. The correlation peak can be used to detect the event and approximate its location.

Various versions implement the dispersion signature extraction as a matrix operation of the form p=Ms, where p is a vector constructed from pixel values registered at the imaging-sensor array, s is a vector comprising the spectral content of the dynamic event and M is a matrix that maps the event spectrum onto a map of the imaging-sensor array. The matrix M is determined by the dispersion apparatus, the imaging optics and the imaging-sensor array and is also a function of the event location. Once the event location is approximated, then the spectral content of the event can be ascertained by inverting the matrix as represented by s=M$^{-1}$p. It will be appreciated that the data processing aspects can be implemented on the sensor platform or the data registered at the imaging-sensor array can be downlinked for processing at a remote site. Data processing at the sensor platform will typically reduce the bandwidth requirements of the sensor data link.

Representative embodiments are more completely described in the following detailed description, the elucidation of which is facilitated by the schematic representations of, and numerical and graphical data relating to, an illustrative embodiment contained in the accompanying drawings.

BRIEF DESCRIPTION OF THE DRAWINGS

FIG. 1 schematically depicts the architecture of an illustrative spectral analysis system;

FIG. 4A is a graphical representation of pre-stored data indicative of an attributed pre-contrived electromagnetic-energy dispersion pattern associated with an illustrative set of optical dispersion apparatus;

FIG. 4B is graphical representation of the data represented in FIG. 4A being fitted to an illustrative set of dispersed electromagnetic wavelengths as registered by the imaging sensor array of a spectral analysis system;

DETAILED DESCRIPTION

Figure 1A:
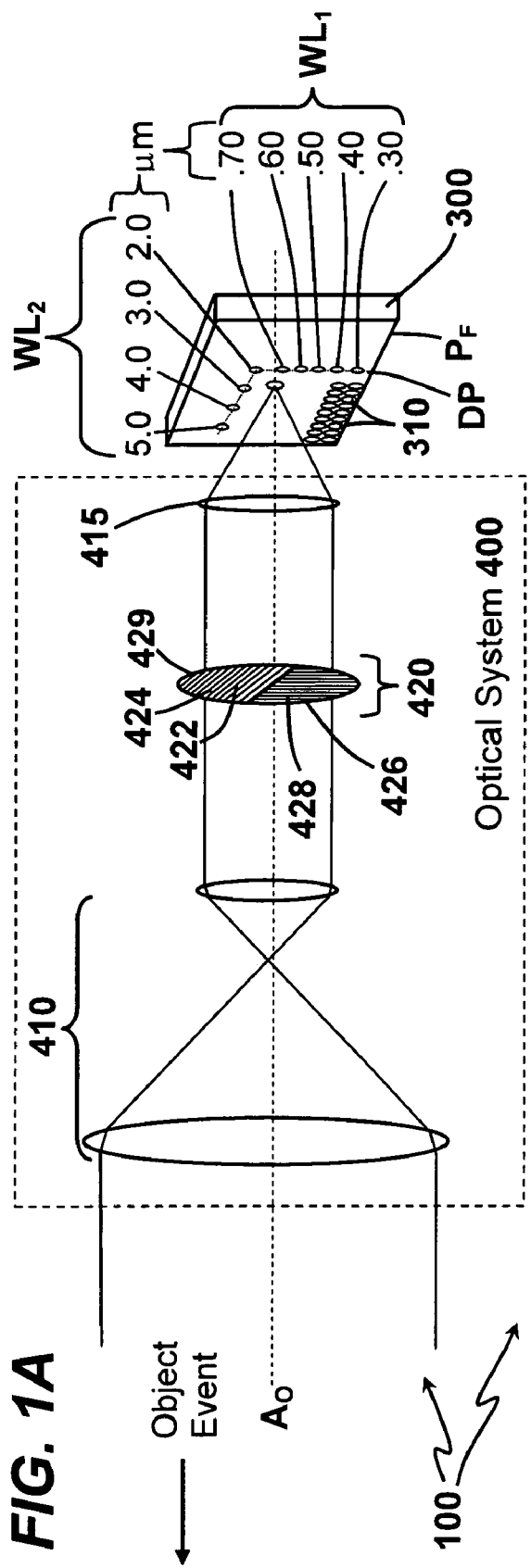
FIG. 1A schematically depicts the architecture of an alternative illustrative spectral analysis system.

The following description of apparatus for and methods of analyzing the spectral signature of an "energetic" dynamic event is illustrative in nature and is therefore not intended to limit the scope of the invention or its application of uses.

Referring to FIG. 1, the architecture of an illustrative spectral analysis system 100 is schematically represented and includes (i) a data processing system 200; (ii) an imaging-sensor array 300 communicatively linked to the data processing system 200 and (iii) an optical system 400 configured for imaging electromagnetic energy emitted from an object source event (not shown) external to the optical system 400 onto the imaging-sensor array 300.

The data processing system includes a central processor 210 and a memory 215 and is programmed to execute spectral analysis algorithms 220 as described in more detail further in this description. Alternative implementations incorporate any of a variety of conventional imaging sensor arrays 300 configured to detect wavelengths over a predetermined range of electromagnetic wavelengths. An illustrative non-limiting example of an imaging-sensor array 300 suitable to the illustrative implementation under consideration includes arrayed detectors 310 comprising indium antimonide (InSb), which are responsive to wavelengths of light ranging approximately from 0.40 μm through 5.0 μm.

The optical system 400 schematically represented in the illustrative implementation of FIG. 1 includes a telescope 410 optically aligned with a set of optical dispersion apparatus 420. Located between the set of optical dispersion apparatus 420 and the imaging sensor array 300 is a lens 415 situated such that the imaging sensor array 300 corresponds in location to the focal plane P$_F$ of the lens 415. The ray trace lines in the schematic of FIG. 1 represent the paths of illustrative light rays in the absence of the set of optical dispersion apparatus 420.

Figure 2:
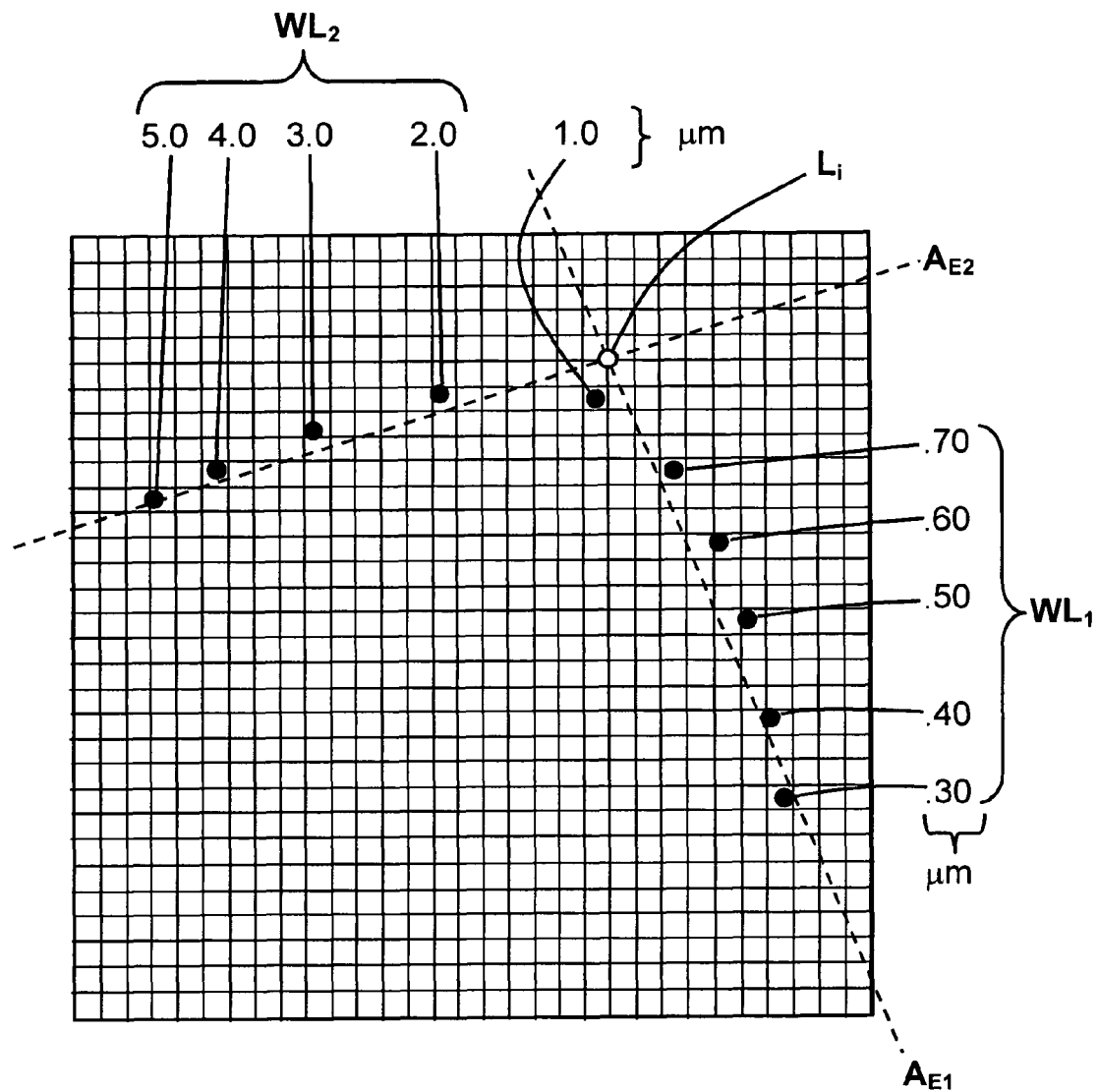
FIG. 2 represents dispersed electromagnetic wavelengths as registered by the imaging sensor array of a spectral analysis system.

Referring to FIGS. 1 and 2, the optical dispersion apparatus set 420 in the particular version of FIG. 1 includes a first optically dispersive element 422 that disperses a first selected set of wavelengths WL$_1$ within the sensitivity range of the imaging-sensor array 300 generally along a first extrapolated axis A$_{E1}$ extending along the focal plane P$_F$ and a second optically dispersive element 426 that disperses a second selected set of wavelengths WL$_2$ within the sensitivity range of the imaging-sensor array 300 generally along a second extrapolated axis A$_{E2}$ extending along the focal plane P$_F$ in a direction that is non-parallel to the first extrapolated axis A$_{E1}$. The optically dispersive elements 422 and 426 are selected such that the first optically dispersive element 422 is less dispersive of the second set of wavelengths WL$_2$ than of the first set of wavelengths WL$_1$ and the second optically dispersive element 426 is less dispersive of the first set of wavelengths WL$_1$ than of the second set of wavelengths WL$_2$. Moreover, as will be readily appreciated by reference to FIG. 1, the optical dispersion apparatus set 420 is configured such that the impingement upon the focal plane P$_F$ of first and second selected sets of wavelengths WL$_1$ and WL$_2$ along, respectively, first and second extrapolated axes A$_{E1}$ and A$_{E2}$ is simultaneous. Although constituent wavelengths within each of the first and second selected sets of wavelengths WL$_1$ and WL$_2$ are caused to impinge simultaneously upon the focal plane P$_F$, it will be appreciated that, in the particular illustrative version of FIG. 1, the dispersion of wavelengths within each of first and second selected sets of wavelengths WL$_1$ and WL$_2$ may be regarded as "sequential" or "serial." That is, most of the dispersion of wavelengths within the first wavelength set WL$_1$ results when the light emitted from the object event passes through the first optically dispersive element 422, while most of the dispersion of wavelengths within the second wavelength set WL$_2$ results when the light emitted from the object event, including the wavelengths within the first wavelength set WL$_1$, passes, at a later time, through the second optically dispersive element 426. For purposes of this specification and the appended claims, optically dispersive elements 422 and 426 exhibiting the aforementioned relative dispersion characteristics are referred to as "dispersively complementary" or, interchangeably, "complementary."

Each of the extrapolated axes A$_{E1}$ and A$_{E2}$, in various implementations, represents one of (i) a line that is "best fitted" to a selected set of points or locations along the focal plane P$_F$ at which the various constituent wavelengths within the corresponding one of the selected wavelength sets (i.e., WL$_1$ or WL$_2$) impinges upon the focal plane P$_F$ and (ii) a line parallel to such a "best fit" line. Referring to the graphically represented dispersion pattern of FIG. 2, which represents the simultaneous impingement locations of selected wavelengths registered by the imaging sensor array 300 of FIG. 1, the dispersion pattern DP traces an arcuate path having two "arms" extending away from what can fairly be regarded as an inflection point corresponding to 1.0 μm. In this example, the first extrapolated axis $A_{E1}$ is fitted to the wavelengths between and including 1.0 μm and 5.0 μm and the second extrapolated axis $A_{E2}$ is fitted to the wavelengths between and including 0.30 μm and 1.0 μm. It will be appreciated, at least upon further reading of the specification, that the non-dispersed-location approximating aspect of various implementations improve as the first and second extrapolated axes $A_{E1}$ and $A_{E2}$ approach orthogonality; correlatively, a relatively flat arcuate dispersion pattern—or another dispersion pattern in which the extrapolated axes $A_{E1}$ and $A_{E2}$ are close to parallel or collinear—is disadvantageous to the task of estimating the non-dispersed image location in those implementations that reference a non-dispersed image location, a concept that is discussed in greater detail below. Moreover, alternative aspects that do not reference a non-dispersed image location may still, or instead, reference an intersection location $L_i$ at which the first and second extrapolated axes $A_{E1}$ and $A_{E2}$ cross or "intersect." It will be appreciated relative to these latter implementations that parallel or collinear first and second extrapolated axes $A_{E1}$ and $A_{E2}$ do not "cross" and, therefore, would yield no "intersection location $L_i$" to be used as a locating reference. Accordingly, the first and second dispersive elements 422 and 426 of various embodiments should be chosen and oriented so as to disperse the first and second wavelength sets $WL_1$ and $WL_2$ along first and second extrapolated axes $A_{E1}$ and $A_{E2}$ that are at least non-parallel and, preferably, as close to orthogonal as practicable.

Although the specific illustrative examples described in detail herein and depicted in the drawings suggest that each of the first and second wavelength sets $WL_1$ and $WL_2$ includes only wavelengths that are not within the compass of the other wavelength set, it should be understood that this is not the case for all envisioned implementations regarded as within the scope the invention. In other words, the wavelengths included in each of the selected first and second wavelength sets $WL_1$ and $WL_2$ can, in alternative embodiments, be entirely distinct from the wavelengths in the other wavelength set, partially overlapping with wavelengths in the other set or entirely overlapping with wavelengths in the other set. An example of an arrangement in which the first and second wavelength sets $WL_1$ and $WL_2$ overlap entirely (i.e., include identical wavelengths of interest) includes first and second dispersive elements 422 and 426 configured to disperse the same wavelengths oriented such that they disperse the wavelengths in different directions along the focal plane $P_F$ such that, for instance, extrapolated axes $A_{E1}$ and $A_{E2}$ fitted to the resulting dispersion pattern DP cross. It will be appreciated that a case in which the first and second wavelength sets $WL_1$ and $WL_2$ are entirely overlapped may represent an exception to the approach of selecting the optically dispersive elements 422 and 426 such that the first optically dispersive element 422 is less dispersive of the second set of wavelengths $WL_2$ than of the first set of wavelengths $WL_1$ and the second optically dispersive element 426 is less dispersive of the first set of wavelengths $WL_1$ than of the second set of wavelengths $WL_2$. However, this is not necessarily the case as one of dispersive elements 422 and 426 may be configured to disperse the same wavelengths more dramatically than the other of dispersive elements 422 and 426.

Figure 3:
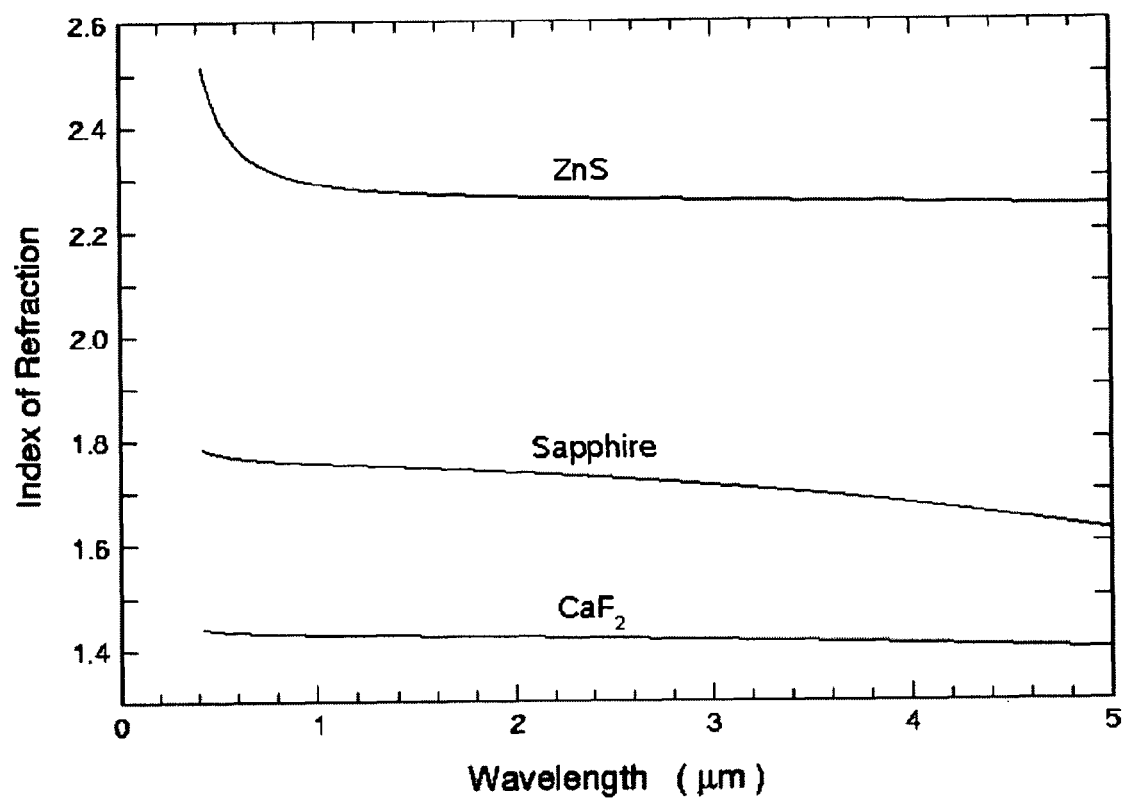
FIG. 3 is a graph of index of refraction versus wavelengths for zinc sulfide, sapphire and calcium fluoride.
Figures 5A, 5B:
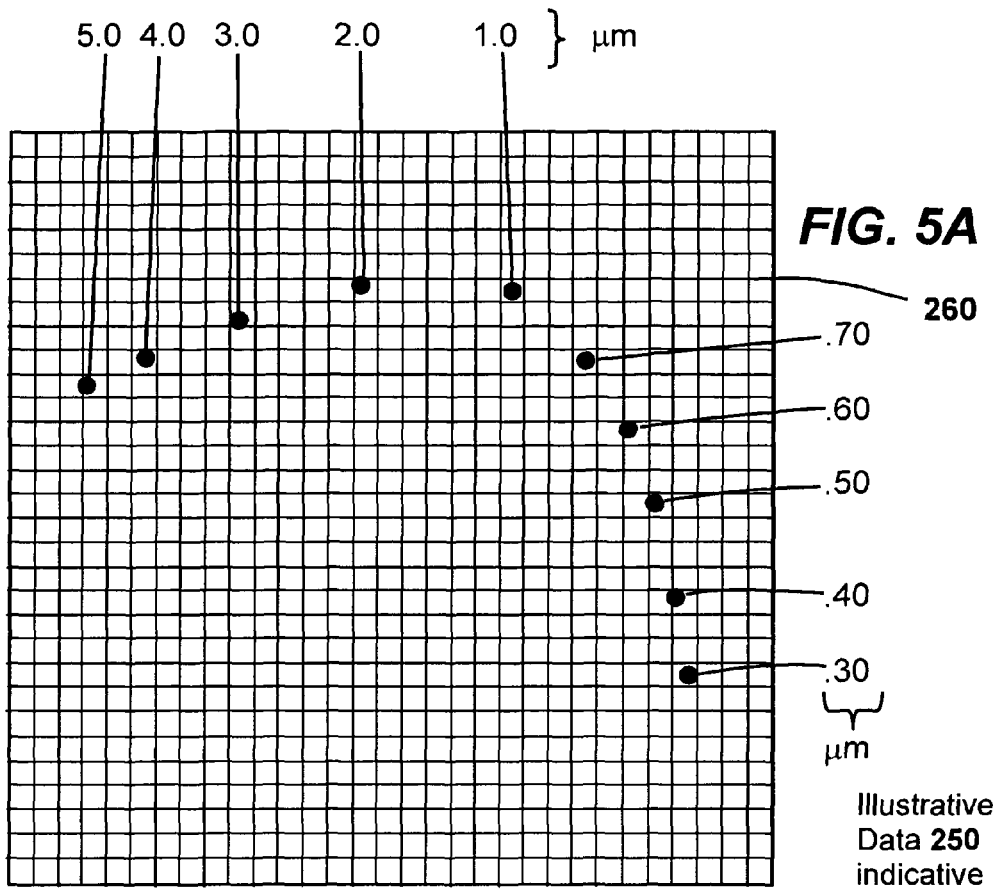
FIG. 5A depicts an impingement-point map representing data indicative of a dispersion pattern registered by the imaging-sensor array of spectral analysis system.
FIG. 5B includes tabulated numerical impingement-point address values of various wavelengths depicted graphically in FIG. 5A and numerical relative intensity data for the represented wavelengths.

In the illustrative embodiment of FIG. 1, the first and second dispersive elements 422 and 426 are first and second prisms 423 and 427 configured to disperse most significantly in and through, respectively, a first visible range (i.e., about 0.40 μm through 0.80 μm) and a second short to medium wave infrared range (i.e., about 2.0 μm to 5.0 μm). An advantageous material from which to fabricate the first prism 423 is zinc sulfide (ZnS)—which actually becomes non-transmissive below about 0.42 μm—because ZnS is sharply dispersive within the prescribed visible range and relatively non-dispersive in the second illustrative wavelength range $WL_2$ (i.e., about 2.0 μm to 5.0 μm). Complementarily, sapphire ($Al_2O_3$) is an advantageous choice for the second prism 427 because it is substantially more dispersive in the 2.0 μm to 5.0 μm range than within the range of 0.40 μm through 0.80 μm, for example. The indices of refraction versus wavelength for ZnS and sapphire are graphically depicted in FIG. 3. Although ZnS and sapphire are suggested herein as particularly advantageous for the illustrative prescribed wavelength ranges, both the wavelength ranges and these materials are regarded as illustrative, non-limiting examples. Accordingly, other materials may be suitable for the particular wavelength ranges prescribed above and, depending on the spectral analysis desired in alternative applications, altogether different wavelength ranges and correspondingly suitable materials may be selected.

Experimentation has revealed that arrangements involving two or more prismatic dispersion elements result in angular deviation of the optical axis $A_O$. Although the various components of the system 100 can be oriented to compensate for this deviation, the mechanical assembly is typically simplified by the introduction of at least one "corrective" optical element 430 to redirect the optical axis $A_O$. Ideally, the index of refraction of a corrective optical element 430 is constant as a function of wavelength. However, because, in practice, there are no optically transmissive materials for which the refractive index does not vary, however little, with wavelength, a material is chosen that exhibits as constant a refractive index as practicable over the wavelength ranges of interest. For instance, as shown in the refractive index versus wavelength graph of FIG. 3, the refractive index of calcium fluoride ($CaF_2$) is relatively constant over the illustrative first and second wavelength sets $WL_1$ and $WL_2$ extending through and between 0.40 μm and 5.0 μm. In the particular embodiment schematically depicted in FIG. 1, a corrective element 430 is present following each of the first and second prisms 423 and 427. Arrangements employing a single corrective element 430 following both prisms 423 and 427 in the optical train are feasible and within the scope and contemplation of the invention, but have proven substantially more difficult to fabricate.

Alternative dispersion apparatus 420 may, in various embodiments, be used in place of prisms 423 and 427 as optically dispersive elements 422 and 426. For example, as shown in FIG. 1A, diffraction gratings 424 and 428 serve as first and second optically dispersive elements 422 and 426. The diffraction gratings 424 and 428 in this particular illustrative arrangement are incorporated into a unitary grating structure 429. Although the particular implementation of FIG. 1A does not include a corrective element 430, it will be appreciated that one or more optically corrective elements 430 may be advantageous in alternative implementations incorporating one or more gratings. Moreover, in actual practice, an arrangement of gratings 424 and 428 such as that shown in FIG. 1A would typically yield, in the absence of some "correction," a +-shaped dispersion pattern DP rather than the L-shaped dispersion pattern DP depicted for clarity in the illustration. As a point of conceptual distinction between the arrangements of FIGS. 1 and 1A, if the prisms 423 and 427 in the arrangement of FIG. 1 cause dispersion that is regarded as "serial" or "sequential," as previously explained, then it is fair and reasonable to regard the dispersion of the first and second wavelength sets $WL_1$ and $WL_2$ caused by the gratings 424 and 428 in the illustrative arrangement of FIG. 1A as "simultaneous."

In still additional alternative embodiments, "hybrid" devices known as "GRISMs" having both diffractive and refractive properties are used to disperse the wavelengths of interest. Moreover, some GRISM configurations include optical-axis correcting properties and obviate the need for a separate corrective element such as 430. It will be appreciated that the particular dispersive apparatus selected for incorporation in any particular embodiment is of no particular consequence so long as the selected apparatus disperse the wavelengths of interest in accordance with parameters appropriate to the particular application and so long as the selected dispersive apparatus project upon the focal plane a dispersion pattern that extends generally along two non-parallel extrapolated axes simultaneously. Prisms, gratings and GRISMs are suggested herein only by way of non-limiting example and, furthermore, it is generally immaterial to the intended functions of the invention whether a particular embodiment incorporates an optical dispersion apparatus set 420 that disperses first and second wavelength sets $WL_1$ and $WL_2$ sequentially or simultaneously, as described in conjunction with the illustrative versions of, respectively, FIGS. 1 and 1A. Accordingly, the available combinations and arrangements of dispersive, corrective and focusing elements suitable to any of various applications, and within the scope of the invention as set forth in the appended claims, are limited only by the collective capacity of human ingenuity to devise them.

In various embodiments implementing either a grism or a grating as an optically dispersive element, it is advantageous to filter the grism or grating such that it passes only the wavelengths that element is intended to disperse. For instance, in an arrangement such as that of FIG. 1A, if the diffraction grating 424 is configured to disperse light in the visible range and the diffraction grating 428 is configured to disperse light in the infrared range, the diffraction grating 424 is filtered at least to the extent that it does not pass infrared light and the diffraction grating 428 is filter at least to the extent that it does not pass visible light.

Figure 6:
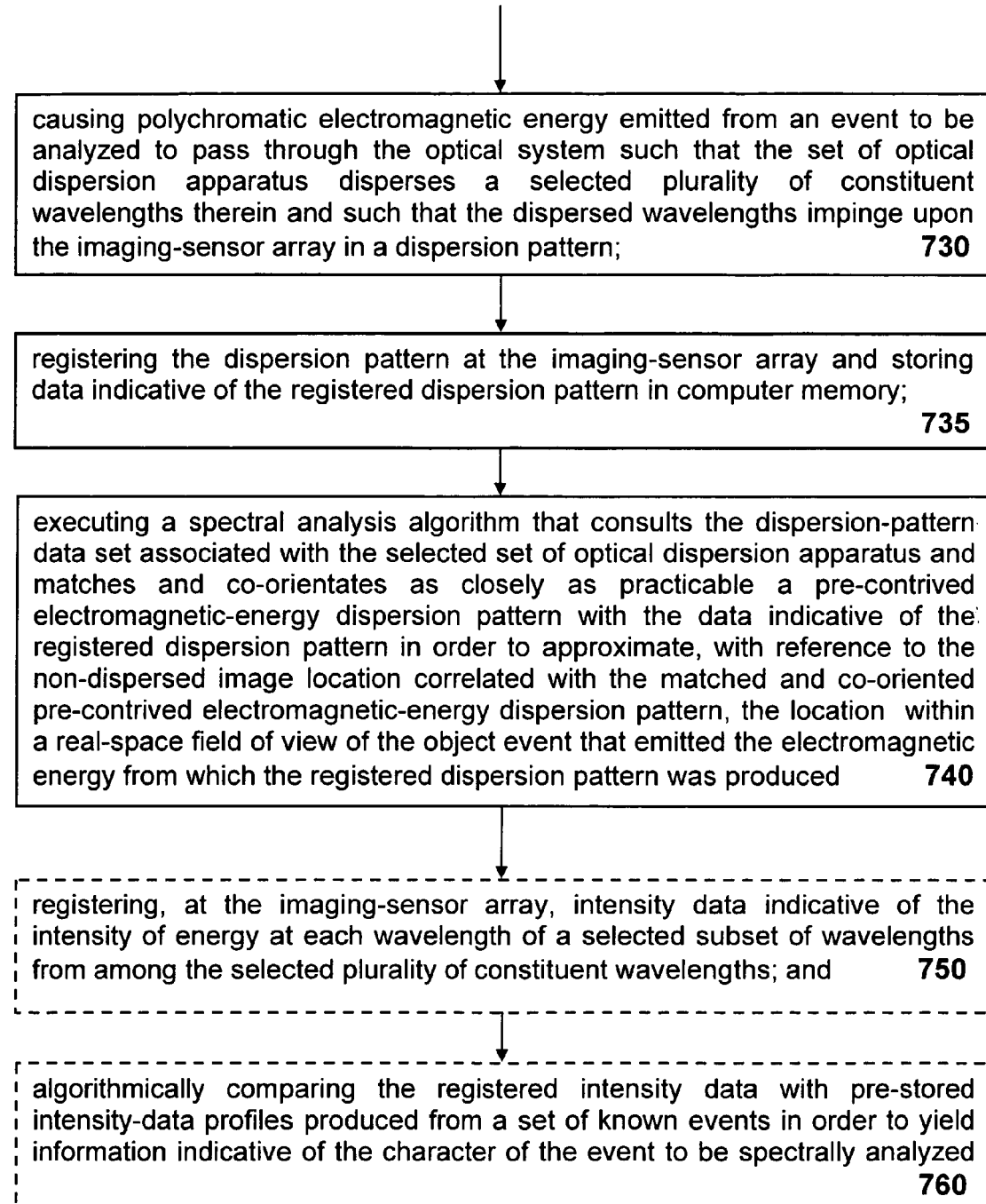
FIG. 6 depicts steps in an illustrative method of analyzing the spectral signature of a source event in order to approximate the location of the event within a predetermined field of view.

In conjunction with FIGS. 1 through 6, an illustrative method of analyzing the spectral signature of a point-like, energetic dynamic event in order to approximate the location of the event within a predetermined field of view is now described. Referring to FIG. 6, a sequence of method steps illustrates a method of approximating the location of a dynamic event. It should be noted that the sequence of steps presented in the drawing and the text to follow is illustrative only and not necessarily indicative of the order in which the steps must be performed. Accordingly, nothing in the drawings, this description or the corresponding claims should be construed so as to limit the scope of the invention to a particular sequence of steps in the absence of explicit statements to the contrary or unless a particular order is inextricably dictated by context (e.g., an instance in which it is impossible to perform a particular step prior to the performance of another step.). Moreover, although the particular apparatus used to execute method aspects is not relevant, reference is made to the illustrative apparatus of FIGS. 1 and 2 to facilitate comprehension of the method.

The illustrative method 700 presented in FIG. 6 includes a step 710 of providing a data processing system 200 including a central processor 210 and at least one memory device 215 communicatively linked to the processor.

At 715, an imaging-sensor array 300 configured to detect wavelengths over a predetermined range of electromagnetic wavelengths in provided. The imaging-sensor array 300 is communicatively linked to the data processing system 200 in an operative manner that facilitates processing by the data processing system 200 of spectral data registered at the imaging sensor array 300.

Step 720 prescribes providing an optical system 400 configured for imaging electromagnetic energy emitted from a source event external to the optical system 400 onto the imaging-sensor array 300. The optical system 400 includes a selected set of optical dispersion apparatus 420 and a focusing element (e.g., a lens 415) situated between the dispersion apparatus 420 and the imaging-sensor array 300 such that the imaging-sensor array 300 corresponds in location to the focal plane $P_F$ of the focusing element. The set of optical dispersion apparatus 420 is characterized at least in part by a set of attributed pre-contrived electromagnetic-energy dispersion patterns 230 (see, for example, FIG. 4A) including at least one dispersion signature correlating, in this particular illustrative case, a non-dispersed image location NDIL along the focal plane $P_F$ with impingement positions upon the focal plane $P_F$ of a plurality of dispersed wavelengths within the sensitivity range of the imaging-sensor array 300. The non-dispersed image location NDIL is indicative of where, relative to the impingement positions of the dispersed wavelengths, the polychromatic image of an object event located at a predetermined position within a predetermined field of view would be located along the focal plane $P_F$ in the absence of the optical dispersion apparatus 420 and, therefore, serves as a basis for estimating the location of an emitting source event. In other words, as previously discussed in the summary, a non-dispersed image location NDIL is a reference used to achieve the more general objective of correlating a source-event location, within a predetermined field of view, with impingement positions upon the focal plane $P_F$ of a plurality of dispersed wavelengths within the sensitivity range of the imaging-sensor array 300.

As previously described, the location of a source event within a predetermined field of view may be correlated to impingement positions upon the focal plane $P_F$ of a plurality of dispersed wavelengths by referencing one or more points, other than or in addition to a non-dispersed image location NDIL, along the focal plane $P_F$. A logical point of reference used in various alternative implementations, and previously described in association with FIG. 2, is the intersection location $L_i$ indicative of where first and second extrapolated axes $A_{E1}$ and $A_{E2}$ associated with a dispersion pattern intersect. Even in some implementations in which a non-dispersed image location NDIL is referenced, the intersection location $L_i$ is also referenced because it can be used to locate the non-dispersed image location NDIL and/or, in conjunction with the non-dispersed image location NDIL, facilitate positioning and orientating of a pre-contrived electromagnetic-energy dispersion pattern 230 "over" data indicative of a registered dispersion pattern in a manner that will be more fully appreciated upon complete review of the detailed description.

Step 725 indicates the maintenance (e.g., in computer memory 215) of an attributed dispersion-pattern data set 235 associating the selected set of optical dispersion apparatus 420 with data indicative of the set of pre-contrived electromagnetic-energy dispersion patterns 230. FIG. 4A graphically represents data in a pre-stored dispersion-pattern data set 235 (shown in FIG. 1) including data indicative of a pre-contrived electromagnetic-energy dispersion pattern 230 associated with the set of optical dispersion apparatus 420. Referring to the illustrative pre-stored dispersion signature of FIG. 4A, the non-dispersed image location NDIL is positionally related to a selected plurality of dispersed-wavelength impingement positions as indicated by the X's along the fitted curvilinear path. The non-dispersed image location NDIL is, for instance, an arbitrary location at which the optical system 400 would image a distant object event along the focal plane $P_F$ in the absence of the selected set of optical dispersion apparatus 420. The dispersed wavelength impingement positions represent where, along the focal plane $P_F$, the optical system 400 causes the various selected wavelengths to impinge relative to the non-dispersed image location NDIL with the selected set of optical dispersion apparatus 420 in place. As indicated in the summary, for the purposes of creating the attributed dispersion-pattern data set 235 for a particular optical system 400, the relative positions of the dispersed-wavelength impingement positions and the non-dispersed image location NDIL can be established by theoretical calculation, experimentation or by a combination of theoretical calculation and experimentation. Also shown in FIG. 4A is an intersection location $L_i$ associated with the pre-contrived electromagnetic-energy dispersion pattern 230 and indicative of where first and second extrapolated axes (not shown) fitted to the wavelength-impingement positions in the pre-contrived electromagnetic-energy dispersion pattern 230 would intersect. Although no extrapolated axes are shown in association with pre-contrived electromagnetic-energy dispersion pattern 230, it will be readily appreciated that the intersection location $L_i$ in FIG. 4A represents information analogous to the information represented by the intersection location $L_i$ shown in the graphically represented dispersion pattern of FIG. 2, which does illustrate first and second extrapolated axes $A_{E1}$ and $A_{E2}$ fitted to wavelength-impingement positions associated with an actual registered event.

At step 730, polychromatic electromagnetic energy emitted from an event to be analyzed is caused to pass through the optical system 400 such that the set of optical dispersion apparatus 420 disperses a selected plurality of constituent wavelengths therein and such that the dispersed wavelengths impinge simultaneously upon the focal plane $P_F$ and the sensors 310 of the imaging-sensor array 300 in a dispersion pattern DP, as shown, for example, in each of FIGS. 1 and 1A.

As indicated at step 735, the dispersion pattern DP is registered at the imaging-sensor array 300 and data 250 indicative of the registered dispersion pattern 255 is stored in computer memory 215. FIG. 2 is a graphical representation of selected electromagnetic wavelengths as registered by the imaging sensor array 300 and FIGS. 5A and 5B include a computer-recorded impingement point map 260 and a computer-recorded tabulation 262 of numerical impingement-point address and relative intensity information, both computer records being illustrative, non-limiting examples of stored data 250 indicative of the registered dispersion pattern 255 registered by the imaging-sensor array 300. Each block in the grid of impingement-point map 260 indicates a unique address in the map 260 and may correspond to one or more sensors 310 in the imaging-sensor array 300. Moreover, an impingement point may, under actual conditions, reside in two or more addresses in a corresponding impingement-point map 260. In general, it will be appreciated that the graphical and numerical representations presented in the drawings are simplified explanatory aids illustrative only of the principles of the invention.

A spectral analysis algorithm 220 that the data processing system 200 is programmed to execute is executed at step 740. Referring to FIGS. 4A and 4B, the algorithm 220 consults the maintained dispersion-pattern data set 235 (see FIG. 1) associated with the selected set of optical dispersion apparatus 420 and matches and co-orientates as closely as practicable a pre-contrived electromagnetic-energy dispersion pattern 230 (FIG. 4A) with the data 250 indicative of the registered dispersion pattern 255 in order to approximate, with reference, for example, to either or both of the non-dispersed image location NDIL and the intersection location $L_i$ correlated with the matched and co-oriented pre-contrived electromagnetic-energy dispersion pattern 230, the location, within a predetermined field of view, of the object event that emitted the electromagnetic energy from which the registered dispersion pattern 255 was produced. More specific to the illustrative algorithmic operation of FIGS. 4A and 4B, the algorithm 220 is superimposing the pre-contrived electromagnetic-energy dispersion pattern 230 of FIG. 4A over the impingement-point map 260 of FIG. 5A, with the superposition being illustrated in FIG. 4B. The corresponding approximated map address for the non-dispersed image location NDIL is at x=16, y=15. As previously indicated in the summary and above in the detailed description, the correlation of relative impingement positions upon the focal plane $P_F$ with a location, within a predetermined field of view, of an emitting source event need not be made with regard or reference to a non-dispersed image location NDIL.

Various implementations further include a step 750 of registering, at the imaging-sensor array 300, intensity data indicative of the intensity of energy at each wavelength of a selected subset of wavelengths within at least one of the first and second sets of wavelengths $WL_1$ and $WL_2$ selected for analysis and a step 760 of comparing, as part of the algorithmic spectral analysis, the registered intensity data with pre-stored intensity-data profiles produced from a set of known events in order to yield information indicative of the character of the event.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact construction, implementations and versions shown and described.

What is claimed is:

1. Apparatus for registering the spectral signature of a dynamic source event, the apparatus comprising:
   an imaging-sensor array configured to register electromagnetic energy over a predetermined range of electromagnetic wavelengths; and
   an optical system configured for imaging onto the imaging-sensor array a dispersion pattern of electromagnetic energy emitted from a source event external to the optical system, the optical system including (i) a focusing element and (ii) a selected set of optical dispersion apparatus including at least a first optically dispersive element that disperses a first selected set of wavelengths within the sensitivity range of the imaging-sensor array and at least a second optically dispersive element that disperses a second selected set of wavelengths within the sensitivity range of the imaging-sensor array such that wavelengths emitted from a source event that are within the first and second selected sets of wavelengths impinge simultaneously upon the imaging-sensor array along, respectively, a first extrapolated axis and a second extrapolated axis that is non-parallel to the first extrapolated axis.

2. The apparatus of claim 1 further comprising a data processing system having a central processor and a computer memory communicatively linked to the processor, wherein the imaging-sensor array is communicatively linked to the data processing system such that data indicative of a dispersion pattern registered at the imaging-sensor array can be stored in the computer memory.

3. The apparatus of claim 2 wherein one of
  (i) at least one of the first and second selected sets of wavelengths includes wavelengths not included in the other selected wavelength set and the first optically dispersive element is less dispersive of the second set of wavelengths than of the first set of wavelengths and the second optically dispersive element is less dispersive of the first set of wavelengths than of the second set of wavelengths; and
  (ii) the first and second selected sets of wavelengths include the same wavelengths and one of (a) the first and second optically dispersive elements are equally dispersive of the same wavelengths and (b) one of the first and second optically dispersive elements is more dispersive of the same wavelengths than the other of the first and second optically dispersive elements.

4. The apparatus of claim 2 wherein each of the first and second optically dispersive elements comprises at least one of (i) a prism, (ii) a diffraction grating and (iii) a grism.

5. The apparatus of claim 4 wherein one of
  (i) at least one of the first and second selected sets of wavelengths includes wavelengths not included in the other selected wavelength set and the first optically dispersive element is less dispersive of the second set of wavelengths than of the first set of wavelengths and the second optically dispersive element is less dispersive of the first set of wavelengths than of the second set of wavelengths; and
  (ii) the first and second selected sets of wavelengths include the same wavelengths and one of (a) the first and second optically dispersive elements are equally dispersive of the same wavelengths and (b) one of the first and second optically dispersive elements is more dispersive of the same wavelengths than the other of the first and second optically dispersive elements.

6. The apparatus of claim 1 wherein each of the first and second optically dispersive elements comprises at least one of (i) a prism, (ii) a diffraction grating and (iii) a grism.

7. The apparatus of claim 6 wherein one of
  (i) at least one of the first and second selected sets of wavelengths includes wavelengths not included in the other selected wavelength set and the first optically dispersive element is less dispersive of the second set of wavelengths than of the first set of wavelengths and the second optically dispersive element is less dispersive of the first set of wavelengths than of the second set of wavelengths; and
  (ii) the first and second selected sets of wavelengths include the same wavelengths and one of (a) the first and second optically dispersive elements are equally dispersive of the same wavelengths and (b) one of the first and second optically dispersive elements is more dispersive of the same wavelengths than the other of the first and second optically dispersive elements.

8. The apparatus of claim 1 wherein one of
  (i) at least one of the first and second selected sets of wavelengths includes wavelengths not included in the other selected wavelength set and the first optically dispersive element is less dispersive of the second set of wavelengths than of the first set of wavelengths and the second optically dispersive element is less dispersive of the first set of wavelengths than of the second set of wavelengths; and
  (ii) the first and second selected sets of wavelengths include the same wavelengths and one of (a) the first and second optically dispersive elements are equally dispersive of the same wavelengths and (b) one of the first and second optically dispersive elements is more dispersive of the same wavelengths than the other of the first and second optically dispersive elements.

9. Apparatus for registering the spectral signature of a dynamic source event, the apparatus comprising:
  an imaging-sensor array configured to register electromagnetic energy over a predetermined range of electromagnetic wavelengths;
  an optical system configured for imaging onto the imaging-sensor array a dispersion pattern of electromagnetic energy emitted from a source event external to the optical system, the optical system including (i) a focusing element and (ii) optical dispersion apparatus including a first set of optically dispersive elements that disperses a first selected set of wavelengths within the sensitivity range of the imaging-sensor array and a second set of optically dispersive elements that disperses a second selected set of wavelengths within the sensitivity range of the imaging-sensor array such that wavelengths emitted from a source event that are within the first and second selected sets of wavelengths impinge simultaneously upon the imaging-sensor array along, respectively, a first extrapolated axis and a second extrapolated axis that is non-parallel to the first extrapolated axis; and
  a data processing system having a central processor and a computer memory communicatively linked to the processor; wherein
  (i) the imaging-sensor array is communicatively linked to the data processing system such that data indicative of a dispersion pattern registered at the imaging-sensor array can be stored in the computer memory; and
  (ii) each of the first and second sets of optically dispersive elements comprises at least one of (i) a prism, (ii) a diffraction grating and (iii) a grism.

10. The apparatus of claim 9 wherein the first extrapolated axis extends substantially orthogonally to the second extrapolated axis.

11. The apparatus of claim 10 wherein the first set of optically dispersive elements is less dispersive of the second set of wavelengths than of the first set of wavelengths and the second set of optically dispersive elements is less dispersive of the first set of wavelengths than of the second set of wavelengths.

12. The apparatus of claim 9 wherein the first set of optically dispersive elements is less dispersive of the second set of wavelengths than of the first set of wavelengths and the second set of optically dispersive elements is less dispersive of the first set of wavelengths than of the second set of wavelengths.

13. The apparatus of claim 9 wherein each of the first and second sets of optically dispersive elements comprises at least one prism.

14. The apparatus of claim 9 wherein each of the first and second sets of optically dispersive elements comprises at least one diffraction grating.

15. The apparatus of claim 9 wherein the first and second extrapolated axes intersect at an intersection location upon the imaging-sensor array and the intersection location is correlated to the location within a real-space field of view of the source event that emitted the electromagnetic energy from which the registered dispersion pattern was produced.

16. The apparatus of claim 15 wherein the first extrapolated axis extends substantially orthogonally to the second extrapolated axis.

17. The apparatus of claim 9 wherein the first and second extrapolated axes intersect at an intersection location upon the imaging-sensor array and the data processing system is programmed to correlate the intersection location to the location within a predetermined field of view of the source event that emitted the electromagnetic energy from which the registered dispersion pattern was produced.

18. The apparatus of claim 17 wherein the first extrapolated axis extends substantially orthogonally to the second extrapolated axis.

* * * * *